(12) United States Patent
Varela

(10) Patent No.: US 6,752,410 B2
(45) Date of Patent: Jun. 22, 2004

(54) INDEPENDENT SUSPENSION FOR LOW PROFILE VEHICLES

(75) Inventor: Tomaz Dopico Varela, Gahanna, OH (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 143 days.

(21) Appl. No.: 10/034,600

(22) Filed: Dec. 28, 2001

(65) Prior Publication Data

US 2003/0122340 A1 Jul. 3, 2003

(51) Int. Cl.$^7$ ................................................. B60G 7/00
(52) U.S. Cl. ...................... 280/124.153; 380/124.138; 380/124.135; 380/124.132; 380/124.109
(58) Field of Search .................. 280/124.126, 124.135, 280/124.136, 124.138, 124.139, 124.111, 124.112, 124.113, 124.153, 124.132, 124.109

(56) References Cited

U.S. PATENT DOCUMENTS

| | | | | |
|---|---|---|---|---|
| 1,351,996 A | * | 9/1920 | Camillo | 280/124.109 |
| 2,705,647 A | * | 4/1955 | Beck | 280/124.113 |
| 3,261,620 A | * | 7/1966 | Cadiou | 280/124.136 |
| 3,279,820 A | * | 10/1966 | Hickman | 280/124.109 |
| 4,462,609 A | * | 7/1984 | von der Ohe | 280/124.143 |
| 4,964,671 A | * | 10/1990 | Millar | 296/178 |
| 4,974,872 A | * | 12/1990 | Riese | 280/124.155 |
| 5,016,912 A | * | 5/1991 | Smith et al. | 280/6.151 |
| 5,062,655 A | * | 11/1991 | Sommerer | 280/124.138 |
| 5,215,328 A | * | 6/1993 | Bono et al. | 280/6.157 |
| 5,275,430 A | * | 1/1994 | Smith | 280/6.151 |
| 5,415,427 A | * | 5/1995 | Sommerer et al. | 280/124.142 |
| 5,566,971 A | * | 10/1996 | Perlot | 280/124.109 |
| 5,692,767 A | * | 12/1997 | Kato | 280/124.142 |
| 5,855,378 A | * | 1/1999 | Capehart | 280/43.11 |
| 6,302,418 B1 | * | 10/2001 | Varela et al. | 280/124.109 |

\* cited by examiner

*Primary Examiner*—Ruth Ilan
(74) *Attorney, Agent, or Firm*—Carlson, Gaskey & Olds

(57) ABSTRACT

An independent suspension module includes a plurality of control members that are positioned to allow the suspension module to be used on low profile vehicles such as low floor buses. The suspension module includes a plurality of control members that couple a support member to the vehicle structure so that the suspension module is appropriately supported relative to the vehicle. The control members include a first end supported near a vertical portion of the lower surface of the vehicle. A second end of at least some of the control members are supported on the support member of the suspension module such that the second ends are positioned between the inboard and outboard sides of the wheels.

11 Claims, 5 Drawing Sheets

INDEPENDENT SUSPENSION FOR LOW PROFILE VEHICLES

BACKGROUND OF THE INVENTION

This invention generally relates to independent suspensions for low profile vehicles such as passenger buses.

A variety of vehicles are in use today. A number of configurations are available for various needs. One particular type of vehicle is known as a low floor bus. Such vehicles are typically characterized by a passenger aisle that is relatively low to the ground so that people entering or leaving the vehicle need not climb stairs. Having a lower level floor provides easier access for younger, older and physically challenged individuals.

While low floor buses serve an important purpose, the necessary design constraints put limitations on other portions of the vehicle. One challenging aspect has been to design an appropriate suspension for the vehicle wheels. Typical packaging space available for drive axles used on low floor buses do not permit the use of an independent suspension module, which is desirable because of the performance characteristics, of independent suspensions. Typical components associated with independent suspension modules are mounted inboard of the wheels and do not fit within the tight space constraints imposed by the nature of the vehicle design. If conventional components were to be used, the aisle space allowable for passengers would be too limited to be practical or acceptable. Alternatively, the control components would be too restricted and the result would be too much camber variation and/or too much track variation at the vehicle wheels.

There is a need for an improved suspension design for low floor buses or low profile vehicles where an independent suspension module can be used. Independent suspension modules have certain advantages compared to other arrangements as known in the art. This invention provides a way to incorporate an independent suspension arrangement on a low floor bus, which can be used at the vehicle drive axle.

SUMMARY OF THE INVENTION

In general terms, this invention is a suspension assembly used on low profile vehicles. A suspension assembly designed according to this invention includes a support member. At least one wheel is supported by the support member such that the wheel is able to rotate about an axis. The wheel has an inboard side and an outboard side. A plurality of control members each have a first end adapted to be connected to a vehicle structure to couple the wheel support member to the vehicle structure. The control members each have a second end that is supported on the wheel support member. The second end of at least some of the control members is positioned between the inboard and outboard sides of the wheel, therefore allowing for long control members.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
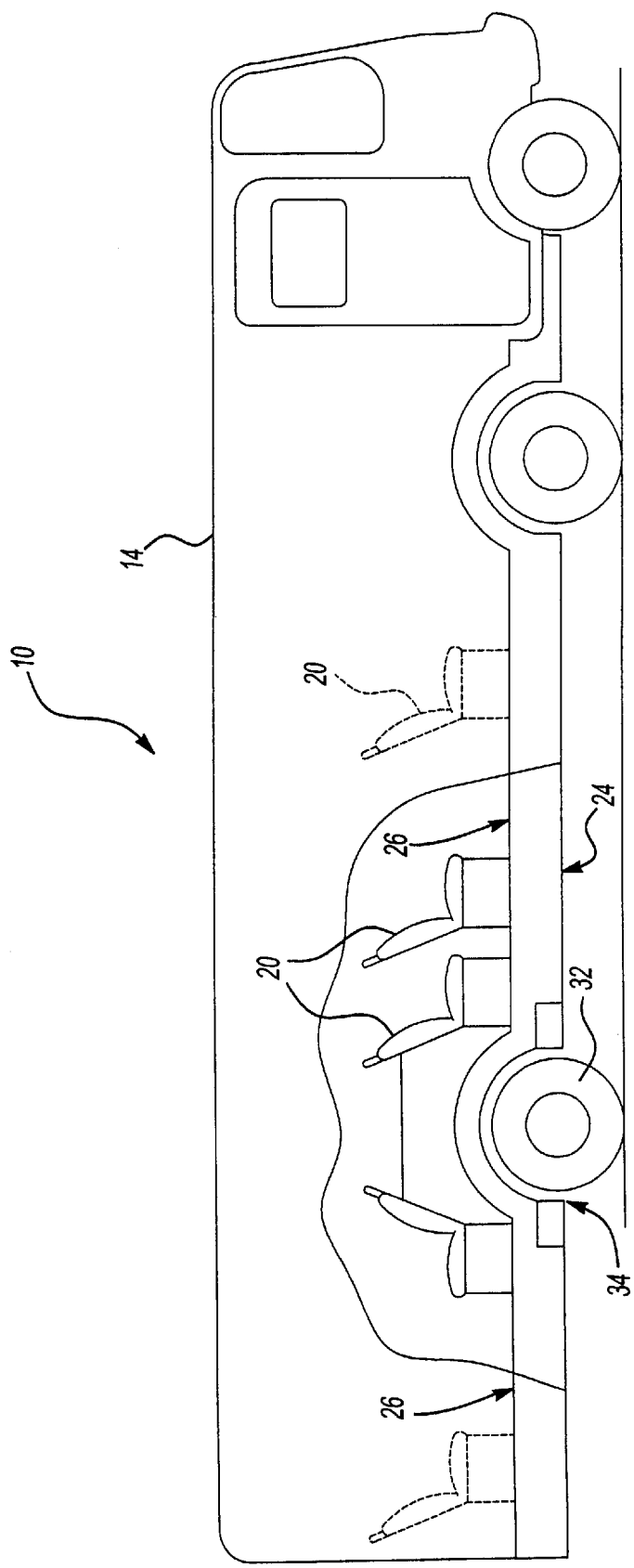
FIG. 1 schematically illustrates an example vehicle designed according to this invention.

A low profile vehicle 10 includes a body or frame 14. The illustrated vehicle is a low floor bus used for mass transit of passengers that occupy seats 20. Other low profile vehicles will benefit from the inventive concepts of this invention. A low floor bus is shown as one example of such a vehicle.

The vehicle frame 14 includes a lower surface 24 that extends along a portion of the length of the vehicle. A passenger aisle 26 is supported at approximately the same level as the lower surface 24. Those skilled in the art know of the various possible arrangements to support the passenger aisle 26 near the lower surface 24.

The lower surface 24 has a horizontal portion 27 that extends along a substantial portion of the length of the lower surface 24. At certain intervals, the lower surface 24 includes vertical surfaces 28 which are positioned to accommodate wheels 32. Basically, the lower surface 24 forms the underbody of the vehicle and wheel wells so that it includes generally horizontal portions 27 and generally vertical surfaces 28 as needed.

An independent suspension module 34 preferably is associated with each wheel 32 or set of wheels 32 on opposite sides of the vehicle 10. Given that the example vehicle 10 is a mass transit low floor bus, there typically will be multiple wheels 32 on each side of the bus along each wheel axis.

The wheels 32 have an inboard side 36 and an outboard side 38 relative to the structure of the vehicle 10.

Each suspension module 34 preferably includes a support member 40 that supports the wheels 32 so that they can rotate about an axis as the vehicle moves. The support member 40 preferably supports shock absorbers 42 and air bags 44, which are known in the art.

Figure 2A:
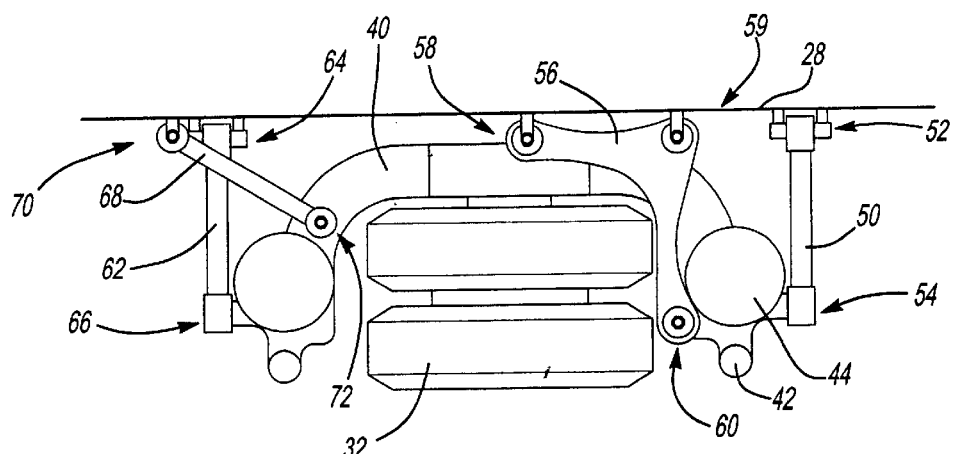
FIGS. 2A through 2C diagrammatically illustrate a first example suspension assembly designed in accordance with this invention.
Figure 2B:
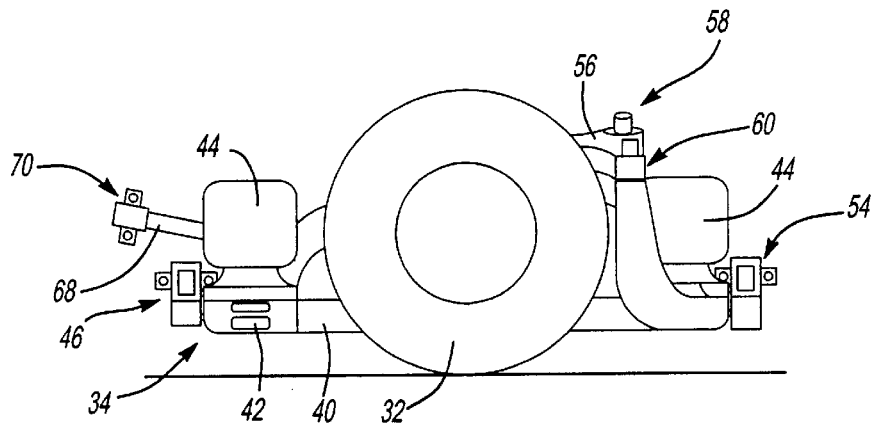
Figure 2C:
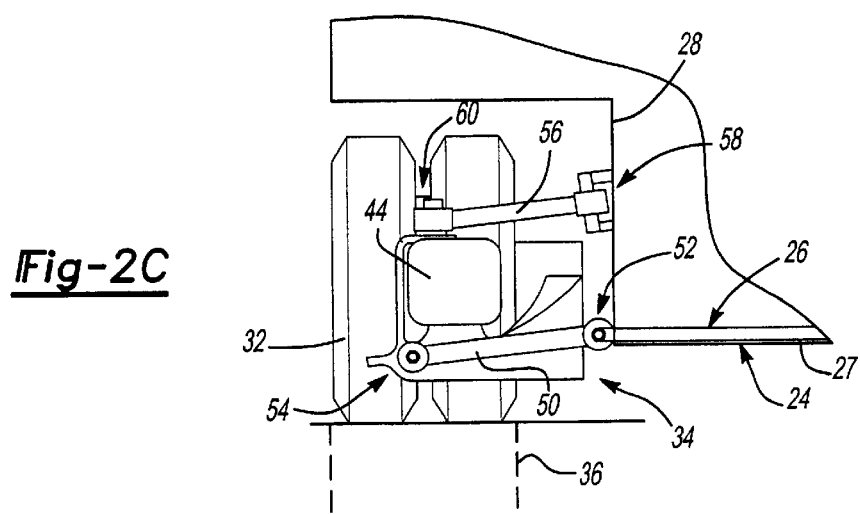

A plurality of control members couple the support member 40 to the structure of the vehicle so that the suspension module 34 is supported relative to the vehicle as needed. In the example of FIGS. 2A through 2C, a lower control rod 50 has a first end 52 supported adjacent to vertical surface 28. In the illustrated example, a coupling at the first end 52 allows some rotation of the lower control rod 50 relative to the vertical surface. A second end 54 of the lower control rod 50 is supported on the support member 40. The second end 54 is preferably positioned between the inboard side 36 and the outboard side 38 of the wheels 32.

An upper control arm 56 includes a first end that is supported adjacent the vertical surface 28. The example of FIGS. 2A through 2C includes two connection points 58 and 59 on the first end of the upper control arm 56. A second end 60 of the control arm is supported on the support member 40 between the inboard side 36 and outboard side 38 of the wheels.

Another lower control rod 62 has a first end 64 supported near the vertical surface 28. A second end 66 of the lower control rod 62 is supported on the support member 40 between the inboard side 36 and outboard side 38 of the wheels. A lower longitudinal control rod 68 has a first end 70 supported adjacent to vertical surface 28. A second end 72 of the lower longitudinal control rod 68 is supported by the support member 40.

The connections between the control members and the support member 40 and the vehicle structure, respectively may take various forms. Those skilled in the art who have the benefit of this description will be able to chose an arrangement that suits their particular situation.

In the example of FIGS. 2A through 2C, the second end of each of the control members (i.e., the control rods and the control arm) is supported by the support member 40 outside of the inboard side 36 of the wheels 32 as seen relative to the vehicle structure. It is preferred to include at least some of the support member ends beyond the inboard side 36 of the wheels 32 such that the ends of the control members are between the inboard side 36 and outboard side 38 of the wheels 32. It is not necessary, however, to have every control member supported in this way. Those skilled in the art who have the benefit of this description will realize various configurations that are possible and will be able to select the appropriate components and support locations to meet the needs of their particular situation.

Supporting one end of the control members between the inboard side 36 and outboard side 38 of the wheels 32 allows for independent suspensions to be used on low profile vehicles such as low floor buses. The space constraints and the typical configuration of control members (i.e., where the entire control member is positioned inboard of the wheels) did not provide a workable solution to incorporate an independent suspension on a low profile vehicle such as a low floor bus. For example, if the upper control members are too short, which would be the case if both ends of the control member were between the inboard side 36 of the wheel and the vertical surface 28, then there is too much camber variation at the wheels 32. If the lower control members were also too short, there would be too much track variation of the wheels. This invention provides a way to obtain longer lengths on the control members to provide better control of the camber and track of the wheels. Moreover, a vehicle and suspension designed according to this invention provides better comfort and better packaging of the components.

Figure 3A:
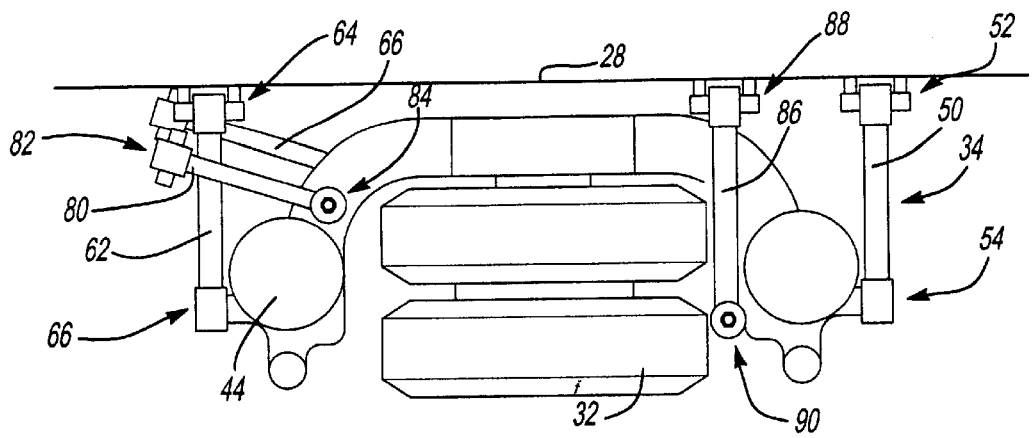
FIGS. 3A through 3C illustrate another example suspension assembly designed according to this invention.
Figure 3B:
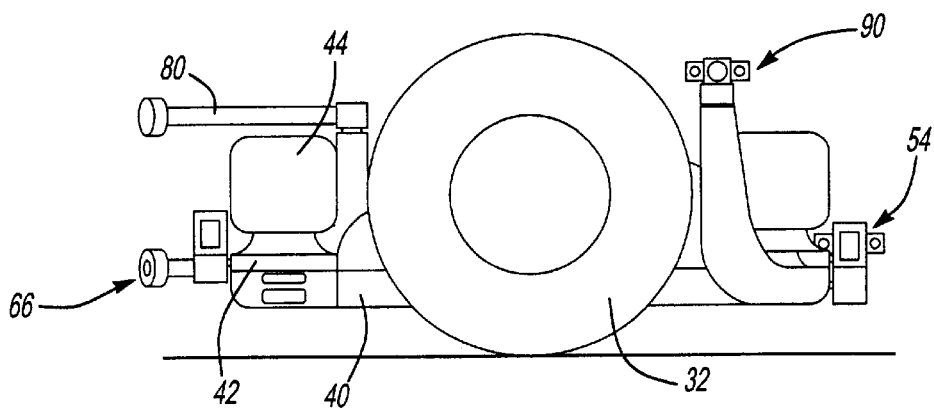
Figure 3C:
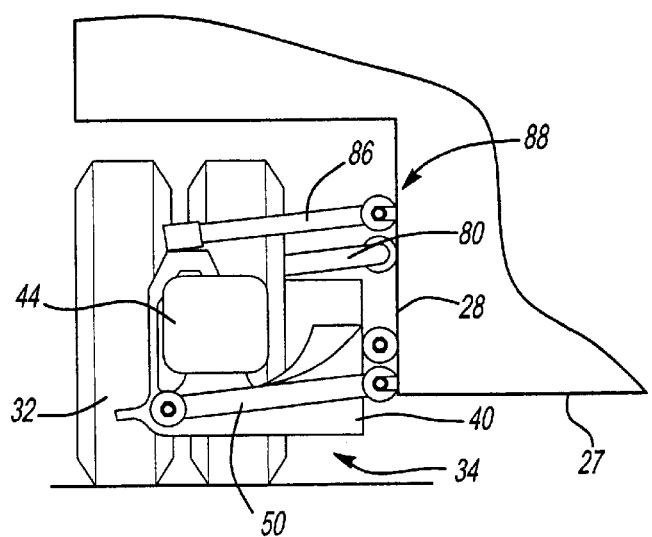

Another example arrangement is shown in FIGS. 3A through 3C where there is no control arm per se. In this example, an upper longitudinal control rod 80 has a first end 82 supported adjacent to vertical surface 28. A second end 84 is supported on the support member 40. An upper control rod 86 has a first end 88 supported near the vertical surface 28 while a second end 90 is supported on the support member 40.

Figure 4A:
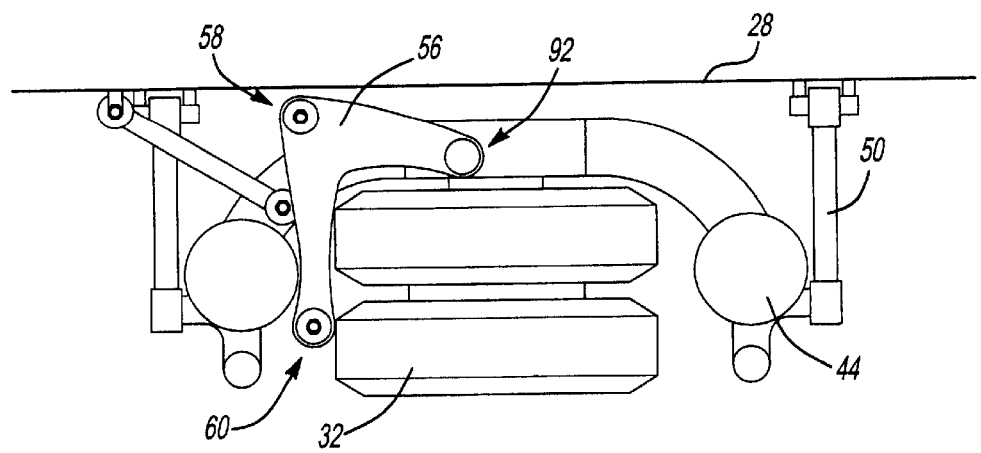
FIGS. 4A through 4C illustrate another example suspension assembly designed according to this invention.
Figure 4B:
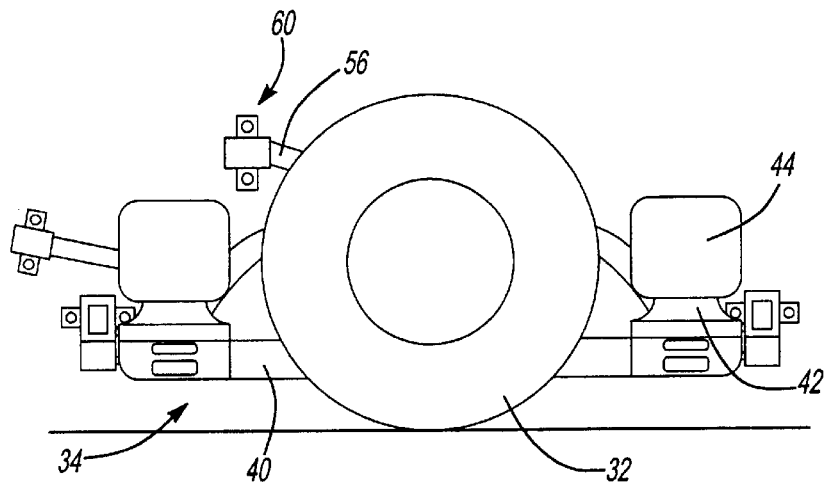
Figure 4C:
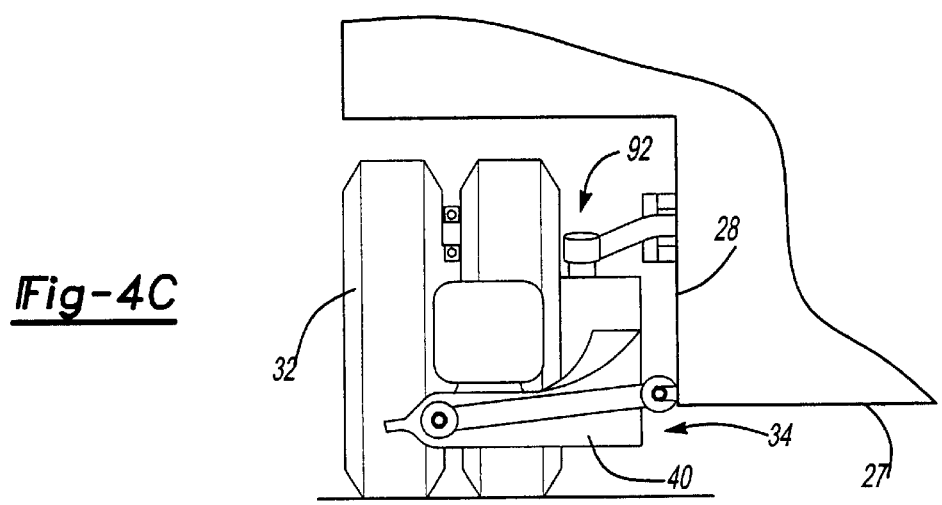

The example of FIGS. 4A through 4C includes an upper control arm 56 positioned differently than that shown in the example of FIGS. 2A through 2C. In this example, a connection point 58 at a first end of the upper control arm 56 is supported adjacent the vertical surface 28. Only one connection point is provided on the first end compared to the two shown in the example of FIGS. 2A through 2C. Another connection portion 92 provides for the control arm to be supported at two points on the support member 40. A second end 60 of the control arm is positioned between the inboard side 36 and outboard side 38 of the wheels while the connection portion 92 is inboard of the wheels.

Figure 5A:
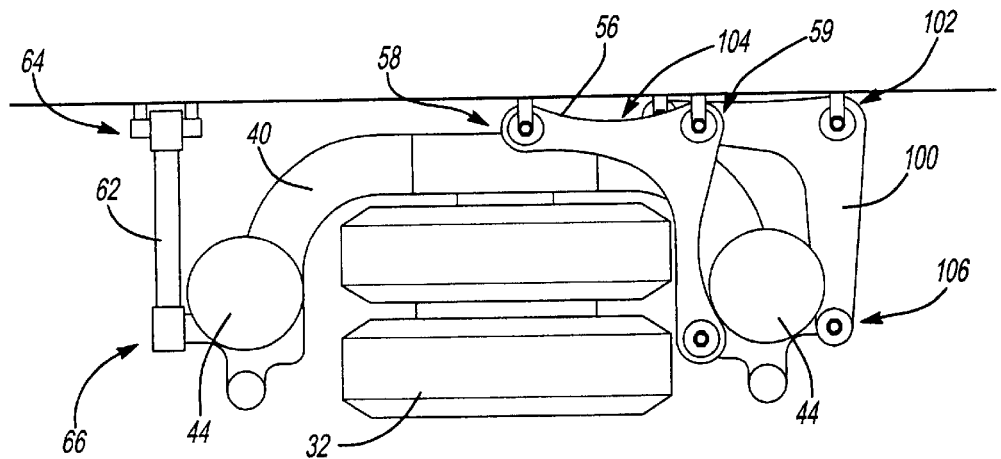
FIGS. 5A through 5C illustrate another example suspension assembly designed in accordance with this invention.
Figure 5B:
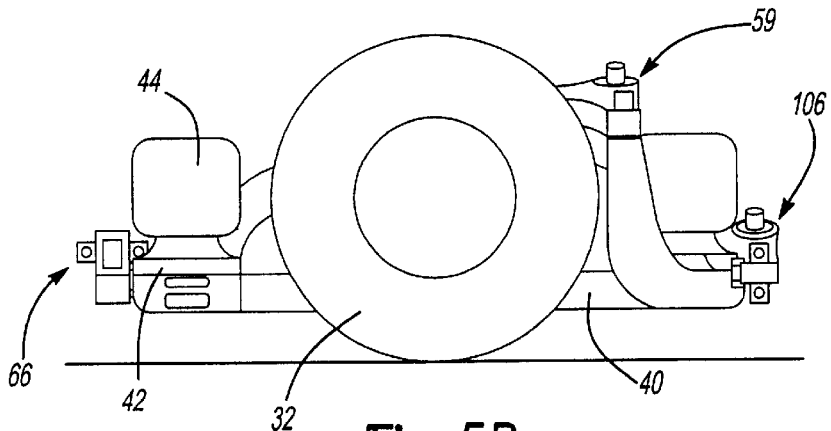
Figure 5C:
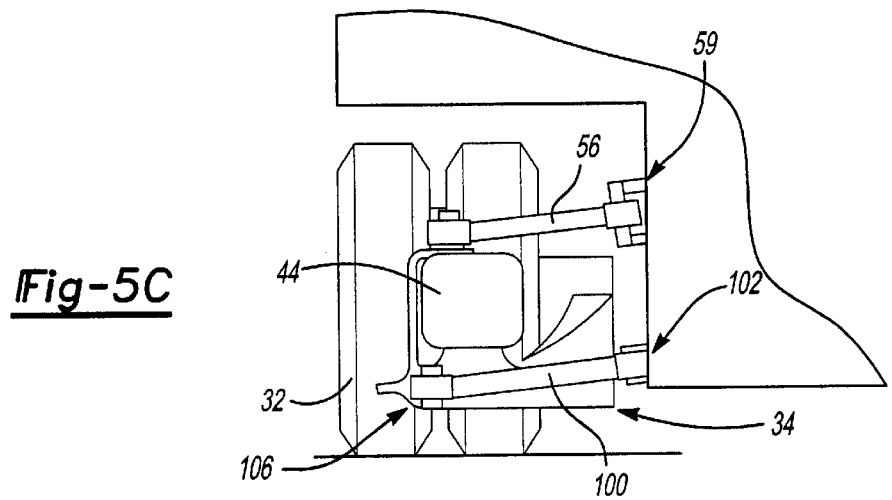

The example of FIGS. 5A through 5C includes two control arms. An upper control arm 56 has two connection points 58 and 59 at the first end adjacent the vertical surface 28. A second, lower (according to the drawing) control arm 100 has a first end supported adjacent the vertical surface 28 with connection points 102 and 104. A second end 106 of the control arm 100 is supported on the support member 40 between the inboard side 36 and outboard side 38 of the wheels.

Various other modifications or arrangements of control members are possible and within the scope of this invention. For example, one or more of the control rods may extend inward beyond the vertical surface 28 and be supported by the horizontal portion 27. Those skilled in the art who have the benefit of this description will be able to choose appropriate components and appropriate arrangements to meet the needs of their particular situation.

The preceding description is intended to provide examples rather than to be limiting in nature. Variations and modifications to the disclosed embodiments may become apparent to those skilled in the art that do not necessarily depart from the essence of this invention. The scope of legal protection given to this invention can only be determined by studying the following claims.

I claim:

1. A low profile vehicle comprising:
   a vehicle body having a lower surface that includes a generally horizontal portion extending along a portion of a length of the vehicle and at least one vertical portion adjacent to the horizontal portion, the vertical portion having a length that is shorter than the length of the horizontal portion;
   a passenger aisle portion supported at approximately the same level as the horizontal portion;
   at least one wheel having a diameter, an inboard side facing toward the vertical portion and an outboard side facing away from the vehicle;
   a plurality of suspension control members, each of which has a first end supported adjacent the vertical portion; and
   a suspension module support member supporting the at least one wheel and a second end of at least one of the suspension control members such that at least one of the second ends is outside of the diameter of the at least one wheel and outboard relative to the inboard side of the at least one wheel;
   wherein the control members include at least one upper control rod and at least one lower control rod.

2. A low profile vehicle comprising:
   a vehicle body having a lower surface that includes a generally horizontal portion extending along a portion of a length of the vehicle and at least one vertical portion adjacent to the horizontal portion, the vertical portion having a length that is shorter than the length of the horizontal portion;
   a passenger aisle portion supported at approximately the same level as the horizontal portion;
   at least one wheel having a diameter, an inboard side facing toward the vertical portion and an outboard side facing away from the vehicle;
   a plurality of suspension control members, each of which has a first end supported adjacent the vertical portion; and
   a suspension module support member supporting the at least one wheel and a second end of at least one of the suspension control members such that at least one of the second ends is outside of the diameter of the at least one wheel and outboard relative to the inboard side of the at least one wheel;
   wherein said at least one of the control members is supported by the vertical portion.

3. The vehicle of claim 2, wherein the control members include at least one control arm.

4. The vehicle of claim 2, wherein at least one of the control members is supported by the horizontal portion.

5. The vehicle of claim 2, wherein the vehicle is a low floor bus mass transit vehicle.

6. The vehicle of claim 2, wherein every second end of the control members is supported by the support member such that every second end is outboard relative to the inboard side of the wheel.

7. A vehicle suspension assembly, comprising:

a support member;

at least one wheel supported by the support member such that the wheel is able to rotate about an axis, the wheel having a diameter, an inboard side and an outboard side;

a plurality of control members each having a first end adapted to be connected to a vehicle structure to couple the support member to the vehicle structure, the control members each having a second end that is supported on the support member and positioned outside of the diameter and between the inboard and outboard sides of the at least one wheel; wherein the control members include at least one upper control rod and at least one lower control rod.

8. The assembly of claim 7, wherein the control members include at least one control arm.

9. A method of assembling an independent suspension module on a low floor bus having a lower surface with at least one vertical portion, comprising the steps of:

positioning a support member near the vertical portion, the support member supporting at least one wheel;

supporting one end of a plurality of control members on the vehicle structure on the vertical portion; and supporting a second end of at least some of the control members on the support member outside of a diameter of the at least one wheel and between an inboard side and an outboard side of the at least one wheel.

10. The method of claim 9, including positioning every second end of the control members between the inboard and outboard sides of the at least one wheel.

11. The method of claim 9, including positioning every second end of the control members outside of the diameter of the at least one wheel.

* * * * *